J. E. COTTRELL.
ATTACHMENT FOR BEAN VINE FORKERS.
APPLICATION FILED NOV. 28, 1917.

1,306,139.

Patented June 10, 1919.
2 SHEETS—SHEET 1.

Witnesses:—

Inventor
J.E.Cottrell.

Attorneys

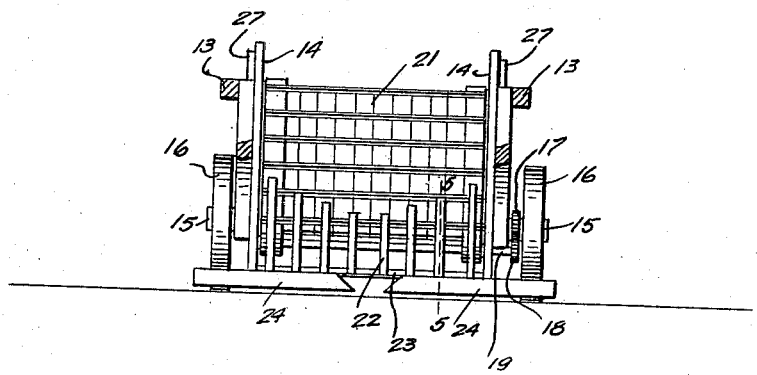
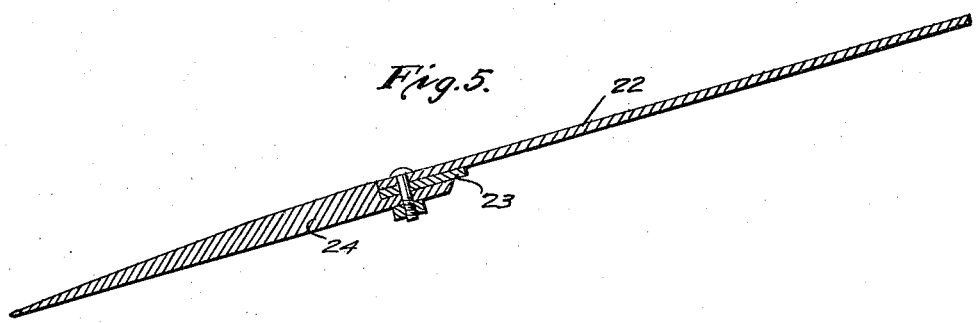
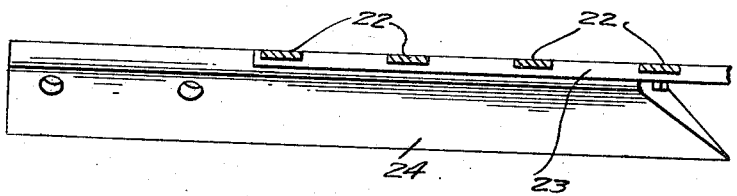

UNITED STATES PATENT OFFICE.

JOHN E. COTTRELL, OF IONIA, MICHIGAN.

ATTACHMENT FOR BEAN-VINE FORKERS.

1,306,139. Specification of Letters Patent. Patented June 10, 1919.

Application filed November 28, 1917. Serial No. 204,373.

*To all whom it may concern:*

Be it known that I, JOHN E. COTTRELL, a citizen of the United States, residing at Ionia, in the county of Ionia, State of Michigan, have invented certain new and useful Improvements in Attachments for Bean-Vine Forkers; and I do hereby declare the following to be a full, clear, and exact description of the invention, such as will enable others skilled in the art to which it appertains to make and use the same.

This invention relates to improvements in bean vine forking devices and particularly to attachments therefor.

The principal object of the present invention is to provide an attachment for a bean vine forking machine whereby two or more rows of bean vines can be dug up, drawn together, elevated toward the rear of the machine and dumped in a single row.

Another object of the present invention is to provide an attachment which can be readily and quickly adapted to the ordinary bean vine puller or forker, thereby adding to the capacity as well as the usefulness of the machine.

Other objects and advantages will be apparent from the following description when taken in connection with the accompanying drawings.

In the drawings:

Fig. 4 is a front elevation of the elevating device removed from the digging machine.

Fig. 5 is an enlarged vertical sectional view taken on the line 5—5 of Fig. 4.

Fig. 6 is an enlarged transverse sectional view taken on the line 6—6 of Fig. 2.

Figure 1:
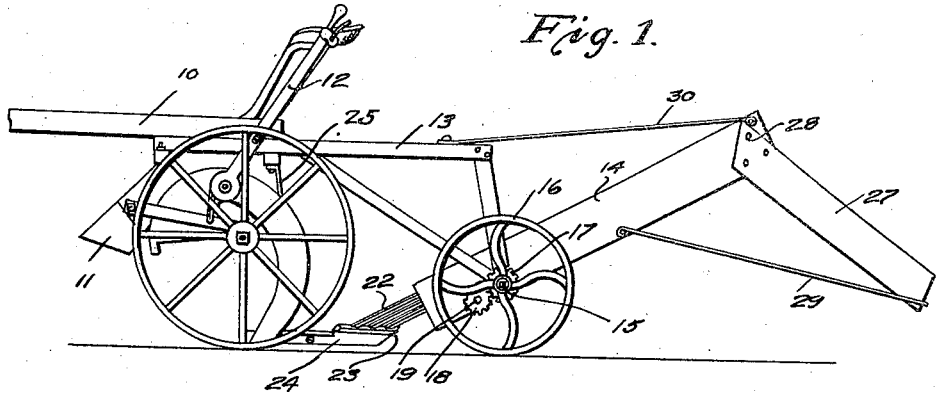
Figure 1 is a side elevation of a machine made in accordance with my invention.
Figure 2:
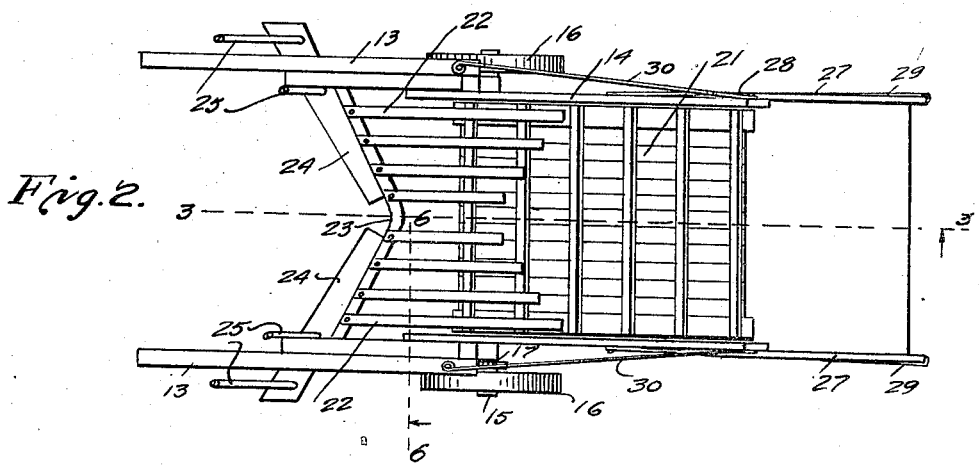
Fig. 2 is a top plan view of the same.
Figure 3:
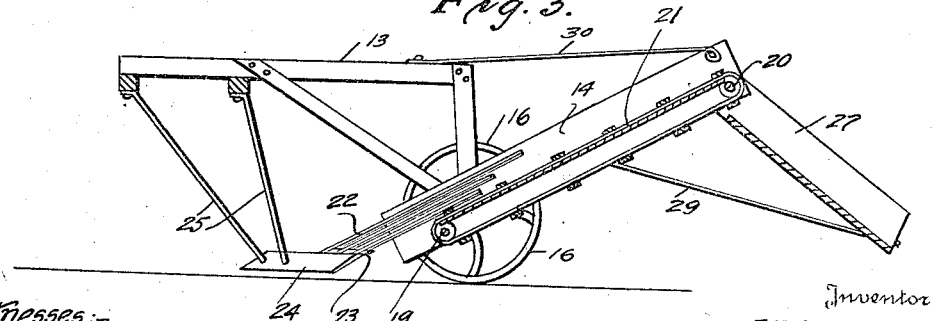
Fig. 3 is a longitudinal sectional view taken on the line 3—3 of Fig. 2.

Referring particularly to the accompanying drawings there is shown a bean vine pulling machine which includes a frame, shown at 10, the digging elements 11, and the levers 12 for raising and lowering the digging elements.

Connected to, and extending rearwardly from the rear of the frame 10, is a frame 13 to which is connected an upwardly and rearwardly inclined trough or runway 14. Stub axles 15 are mounted in the lower forward end of the runway, and on these axles are mounted the ground engaging wheels 16, which support the said runway. On one axle, inwardly of the wheel, there is mounted a pinion 17 which meshes with a pinion 18 carried on the adjacent end of a roller 19 which is also mounted in the lower forward end of the runway, and whereby said roller is turned. In the upper rear end of the runway there is mounted a second roller 20, and engaged around these two rollers is an endless elevating apron or belt 21.

Secured to the lower end of the runway are the forwardly extending and spaced bars 22, to the forward ends of which are connected the transverse bars 23. Detachably secured to these bars 23 are the knives 24 which cut the bean vines and pass them up to the bars 22, as the machine proceeds. From the bars 22 the vines pass onto the endless belt and are carried upwardly and rearwardly where they are dumped in a single row from the upper rear end of the runway. Supporting and brace rods 25 are connected to the outer ends of the knives and to the frame 13 for the purpose of holding the knives and bars 22 in proper position. It will be noted that the knives are arranged in forward divergent relation and also incline out of the vertical plane, whereby the action of cutting and passing the vines is accomplished in a more efficient manner.

Extending downwardly and rearwardly from the upper end of the runway is a chute 27, the same being connected to the runway at 28. Supporting braces 29 are connected to the lower end of the chute and to the sides of the runway. Brace rods 30 are also connected to the upper end of the runway and to the rear of the frame 13, whereby the runway is held in proper position while in operation.

It will thus be seen that as the machine proceeds down the rows of bean vines, the vines will be dug up by the digging elements, and passed to the rear where they will be cut by the knives and pass on to the elevating belt. The knives are so placed that they dig and elevate two rows of vines at one time, depositing them in a single row at the rear of the machine. Thus a great amount of labor is saved.

Heretofore this has been done by men with forks, the men throwing the vines as they are dug up into single rows. It will thus be seen that time as well as labor is saved, with the natural resultant saving of money.

Attention is also called to the fact that the elevating device can be readily attached to the ordinary forking machine now used, thus greatly enlarging its scope and usefulness.

What is claimed is:

1. A forking attachment for a bean vine puller including a frame adapted for detachable connection with the pulling machine, an endless conveyer carried by the frame, a V-shaped member carried by and extending forwardly from the lower end of the frame, forwardly diverging gathering blades secured to the V-shaped member, sifting bars carried by the V-shaped member and extending upwardly and rearwardly above the conveyer, and means for delivering the collected vines in a single row at the rear of the frame.

2. A forking attachment for a bean vine puller including a frame adapted for detachable connection with the pulling machine, an upwardly and rearwardly inclined trough carried by the frame, an endless conveyer in the trough, a forwardly diverging V-shaped member secured in suspended relation on the frame in front of the lower end of the conveyer and trough, gathering blades carried by the arms of the V-shaped member, sifting tines secured to and extending upwardly and rearwardly from the V-shaped member, and a downwardly and rearwardly inclined chute carried by the rear end of the said trough.

In testimony whereof, I affix my signature in the presence of two witnesses.

JOHN E. COTTRELL.

Witnesses:
VINE W. HUNTER,
VERNIE GARFIELD.

Copies of this patent may be obtained for five cents each, by addressing the "Commissioner of Patents, Washington, D. C."